United States Patent [19]

Gerum

[11] 3,742,386

[45] June 26, 1973

[54] AMPLITUDE STABILIZED TRANSISTOR DRIVE CIRCUIT FOR TIME KEEPING DEVICES

[75] Inventor: Erich Gerum, Nurnberg, Germany

[73] Assignee: Diehl, Nurnberg, Germany

[22] Filed: June 25, 1971

[21] Appl. No.: 156,869

[30] Foreign Application Priority Data

June 26, 1970 Germany .................. P 20 31 671.6

[52] U.S. Cl. ............ 331/116 M, 58/23 A, 318/128, 331/109

[51] Int. Cl. .......................... H03b 3/02, H03b 5/36

[58] Field of Search .............. 331/109, 116 M, 156; 58/23 R, 23 A, 23 AC, 23 TF, 28 R, 28 B; 318/128

[56] References Cited

UNITED STATES PATENTS 3,541,777 11/1970 Ganter ...................... 331/116 M X

*Primary Examiner*—Roy Lake
*Assistant Examiner*—Siegfried H. Grimm
*Attorney*—Walter Becker

[57] ABSTRACT

A transistorized amplifier, especially for driving a time-keeping device, in which two transistors, one a driving transistor and the other a control transistor, in the form of an integrated circuit have the collector-emitter path of the driving transistor in circuit with a battery and a driving coil while a control coil and a capacitor is in the base-emitter path thereof. A charging condenser is in the base-collector path of the driving transistor. The control transistor has the collector-emitter path in parallel with the capacitor and is connected to receive opening pulses to the base thereof which are opposed in phase to the opening pulses supplied to the base of the driving transistor.

7 Claims, 2 Drawing Figures

Patented June 26, 1973

3,742,386

Figure 1:
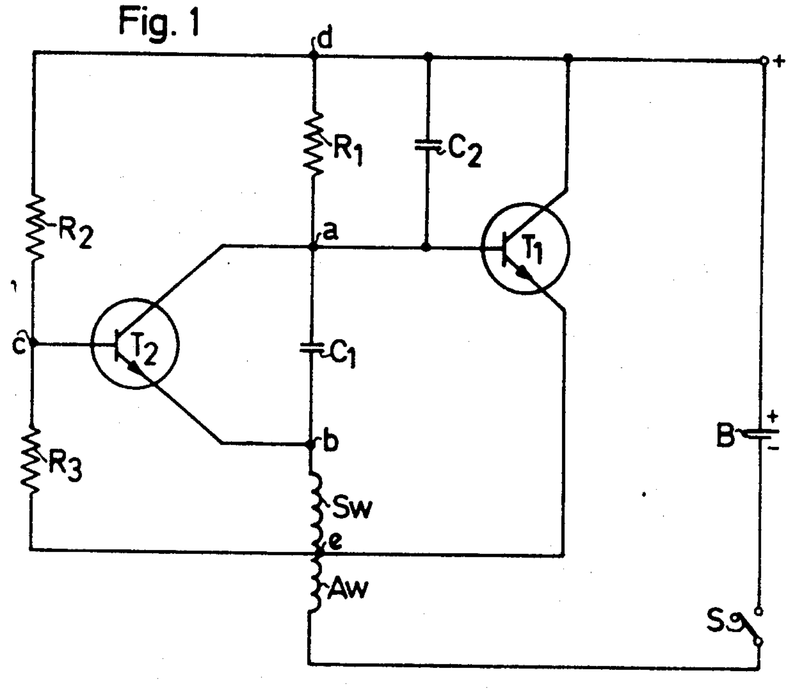

INVENTOR.
ERICH GERUM

BY

Walter Becker

AMPLITUDE STABILIZED TRANSISTOR DRIVE CIRCUIT FOR TIME KEEPING DEVICES

The present invention relates to a control circuit for a transistor amplifier, especially for driving time keeping devices.

It is known, for purposes of driving a time keeping device, especially a clock, to employ an electronic amplifier, especially transistor amplifier, which at its input side comprises a control element, especially a control winding, and on its output side comprises a driving winding, and which by a relative movement between the control and driving winding, on one hand, and a permanent magnet, preferably on the system to be driven, on the other hand, in self control furnishes driving pulses for a system to be driven which oscillates mechanically or rotates. As voltage source, as a rule, a dry battery is arranged in the circuit of the driving winding and of the emitter collector section of the control transistor.

In order to adapt such control arrangement to the requirements of a driving element for time keeping devices, the control arrangement has to meet certain conditions. Thus, it is necessary to design the control arrangement in such a manner that in particular the time errors be reduced to a minimum or eliminated, which time errors are caused by a drop in the operative voltage of the voltage source, especially of the dry battery, by occurring changes in the load and by variations in temperature of the system. Furthermore, the mechanically oscillating or rotating system should possibly be self-starting and non-sensitive to mechanical shocks occurring in certain limits. A further requirement to be met consists in that the control arrangement should, as far as its electronic part is concerned, be adapted to be manufactured as so-called integrated building block with four line terminals.

According to a control circuit meeting the just mentioned conditions, it is suggested between the pole on the control side of a control winding and the base of the control transistor to insert a condenser the coating of which is connected to the base of the transistor and through a charge resistor is connected to the pole of the voltage source which is also connected to the collector of the transistor, and parallel to the said condenser to insert a controllable resistor, especially in the form of a collector-emitter section, of a second so-called control resistor the base of which is connected to the other pole of the voltage source.

When properly dimensioning and poling the individual control elements, this circuit will result in a self-starting of the mechanical system and will also bring about driving pulses which will adapt themselves to the power requirement of the mechanical system for maintaining constant a certain oscillation amplitude or a certain speed of rotation while also up to a certain extent temperature influences and voltage changes of the voltage source are compensated for. A great disadvantage of such a control circuit consists, however, in that the electronic part of the control circuit which is adapted to be built as an integrated building block requires five line terminals which fact makes it unsuited for building it up in the manner of an electronic building block.

While it is possible and has already been suggested to connect the base of the second control transistor to the emitter of the first control transistor whereby that part of the circuit which is adapted to be produced as an integrated building block requires only four line terminals, such an arrangement has the drawback that the control voltage taken from the control winding and controlling the second control transistor — said control voltage being effective during the blocking phase of the first control transistor — will in the working phase of the control transistor displaced by 180° prevail with the same magnitude at the base of this control transistor. As a result thereof there exists the danger that the provided control device will become ineffective and the control amplifier will be controlled at a constant amplitude.

In order to avoid this drawback, it has been suggested to provide a control winding actuated by the magnetic system of the mechanical system in the connecting line between the collector of the control transistor and the base of the switching transistor. This type of circuit, however, is relatively expensive and complicated and does not permit to produce that part of the circuit arrangement which can be made as an integrated building block with only four line terminals.

It is, therefore, an object of the present invention to provide a circuit for a transistor switch amplifier which will overcome the above mentioned drawbacks.

Figure 2:
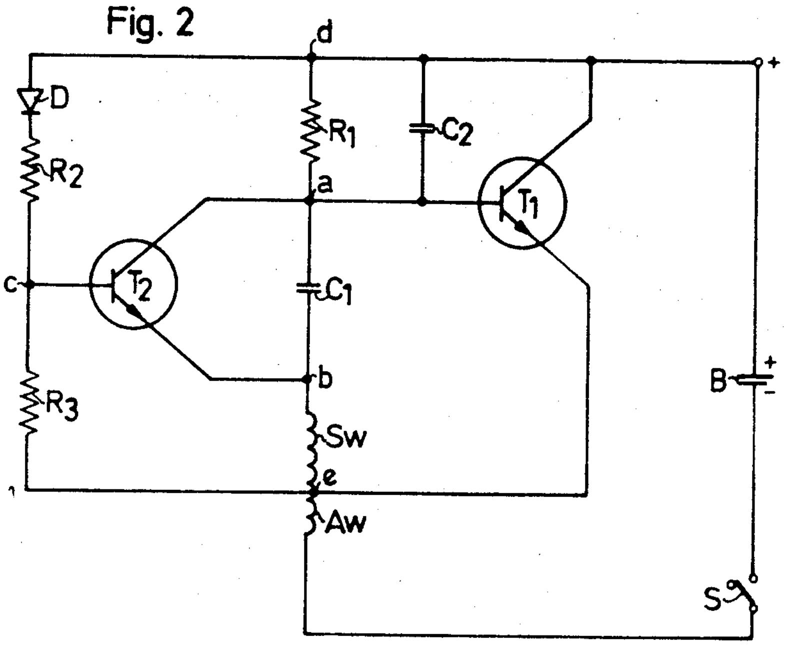

This object and other objects and advantages of the invention will appear more clearly from the following specification in connection with the accompanying drawing, in which:

FIGS. 1 and 2 illustrate circuits according to the present invention.

The present invention overcomes the above outlined drawbacks by a circuit for a transistor switch amplifier, especially for driving time keeping devices, in which in the working circuit of a switching transistor or transistor switch there is provided a driving winding and a direct voltage source (for instance in the form of a dry battery) while the control circuit of this transistor switch has a control winding. In the circuit of the present invention, the control pulses generated in the working circuit serve for driving a mechanically oscillating or rotating system while, due to the movement of this system, control pulses are generated which control the transistor switch. The circuit according to the invention furthermore comprises a condenser which is in series with the control winding in the base emitter circuit of the transistor switch while between the base and that pole of the direct voltage source which is connected to the collector of the transistor switch there is provided a load resistor, and the collector emitter section of a second control resistor is arranged in parallel to the said condenser. At the base of the control transistor there is effective a control voltage which is phase-displaced by 180° with regard to the control voltage on the transistor switch. The control voltage derived from the control winding of the transistor switch and effective at the base of the control transistor has superimposed a further control voltage which is derived from the feeding voltage of the circuit and is of the same polarity as the first control voltage.

For purposes of generating this additional control voltage on the control transistor, which control voltage is derived from the voltage source of the circuit, it is suggested according to the present invention, to provide a voltage divider which is located between the connecting point to the emitter of the transistor switch and its control winding, on one hand, and the collector-adjacent pole of the voltage source, on the other hand, and the tap of which is connected to the base of the second control transistor.

A circuit according to the present invention brings about the advantage that the electronic portion thereof can be produced as integrated building block with only four line terminals. A further advantage of the circuit according to the invention consists in that the circuit has a higher control safety which means is less sensitive relative to strong changes in the load of the mechanical system to be driven by the amplifier system and is also less sensitive relative to changes in the feeding voltage and relative to changes in the temperature.

Referring now to the drawing in detail, FIGS. 1 and 2 shown only the control circuits according to the invention. The mechanical system which is to be subjected to an oscillating or rotating movement by the circuit of the invention, is not shown in the drawing. This system may consist, for instance, of a tuning fork oscillator or a leaf spring oscillator in which at least one of the oscillating arms is provided with a permanent magnet which immerses into a stationary coil arrangement; the coil arrangement may consist of a driving winding Aw and a control winding Sw wound in the same direction relative thereto. It is, of course, to be understood that the windings A*w* and S*w* may be arranged on the oscillator and that the permanent magnet may be arranged stationarily, or the working and control windings may cooperate with different permanent magnets.

The circuit shown in the drawing comprises a direct current source B, for instance in the form of a dry battery, the voltage of which drops from an initial value of 1.7 Volt with increasing discharge down to approximately 1.1 volt at complete discharge. Thus, the control elements of the circuit which cannot be produced as parts of an integrated building block comprise the charging condenser $C_1$, the control and working windings S*w*, A*w* and the condenser $C_2$. The condenser $C_2$ serves for suppressing a self-exciting high frequency oscillation. If desired, the condenser $C_2$ may be replaced by other suitable controlling measures.

The circuits illustrated in FIGS. 1 and 2 comprise n-p-n transistors $T_1$ and $T_2$ which, however, with reversed polarity of the voltage source can also be replaced by p-n-p transistors.

The working circuit of the amplifier switch is formed by the battery B and the driving winding A*w* arranged in series with the collector emitter section of the transistor $T_1$. The control circuit of the amplifier switch is formed by the serially arranged control winding S*w*, a condenser $C_1$ and the base-emitter section of the transistor $T_1$. The layer of the condenser $C_1$, which layer is connected to the base of the transistor $T_1$, is furthermore connected through a resistor $R_1$ with the collector-adjacent pole *d* of the voltage source B.

For purposes of obtaining a control effect with the above described amplifier switch, there is provided a second transistor $T_2$ the collector of which is connected to point *a* and the emitter of which is connected to point *b* of the circuit. Between the points *d* and *e* of the circuit there is provided a voltage divider $R_2$, $R_3$ and the central tap *c* of which leads to the base of the control transistor $T_2$.

The circuit of FIG. 2 differs from that of FIG. 1 merely in that according to the circuit of FIG. 2 between point *d* and the corresponding feeding line to the resistor $R_2$ of the voltage divider there is provided a diode D which is poled in conformity with the conducting direction.

The operation of the control circuit is known in principle. If by means of switch S the working circuit of the transistor $T_1$ is closed, the condenser $C_1$ through resistor $R_1$ is charged. The base of the transistor $T_1$ thus will relative to the emitter obtain such a positive potential that the transistor $T_1$ goes conductive and a quiescent current flows in the working winding A*w*. Already minor movements of the magnetic system will in the control winding S*w* produce control pulses which through the condenser $C_1$ act upon the base of the transistor $T_1$ and are superimposed upon the positive direct voltage prevailing at the base of the transistor $T_1$. In the rhythm of this control alternating voltage, therefore in the working winding of the transistor $T_1$, there will be produced a current fluctuation as a result of which in phase working pulses are conveyed to the oscillating or rotating system. These pulses when reinforced produce control pulses in the control winding Sw and so forth. The circuit according to the invention will therefore bring about a self-starting of the mechanical system.

With increasing amplitude of the alternating voltage generated in the control winding S*w*, a control effect occurs. During the blocking phase of the transistor $T_1$, a control voltage becomes effective at the base of the transistor $T_2$ the alternating current component of which is produced in the control winding S*w*. In view of this control voltage, the transistor $T_2$ becomes conductive and to a corresponding extent the condenser $C_1$ is discharged. This brings about that in the next following working phase of the transistor $T_1$ a reduced control voltage prevails at the base thereof. When suitably dimensioning the individual control elements, especially condenser $C_1$, resistor $R_1$ and the resistors $R_2$, $R_3$ as well as the control winding S*w*, it will be appreciated that with a certain magnitude of the electromotive force in the control winding S*w*, a condition of equilibrium occurs. This condition of equilibrium is characterized in that in successive working phases of the transistor $T_1$, the base of this transistor receives a uniform control voltage which is composed of a direct current component generated by $R_1$ and an alternating current component brought about by S*w*. This means that the additional charging of the condenser $C_1$ effected between two successive working phases by $R_1$ will be canceled by the transistor $T_2$ made more or less conductive.

If the electromotive force generated in the control winding S*w* exceeds a certain value, a reverse control effect occurs in transistor $T_2$. The increased conduction of $T_2$ will between two successive working phases of the transistor $T_1$ bring about a greater discharge of the condenser $C_1$ than current can be supplied through $R_1$. Thus, transistor $T_1$ receives a reduced control voltage so that within a few driving periods the previous equilibrium is restored.

The circuit illustrated in FIG. 1 comprises the novel feature that between the points *d* and *e* of the circuit there is provided a voltage divider $R_2$, $R_3$ the central tap *c* of which is connected to the base of the control transistor $T_2$. Point *e* is located above the working winding Aw of the control amplifier at the minus pole, and the point *d* is located directly on the plus pole of the voltage source B. This means that during the control phase of the circuit, at the base of the transistor $T_2$ there is effected a control voltage which is composed of a voltage drop at $R_3$ and of a electromotive force produced by Sw. Thus, a positive control direct voltage is superimposed upon the control alternating voltage of the control transistor $T_2$ in a manner similar to that of the transistor switch $T_1$.

The advantages of the circuit according to the present invention will be evident from the following. If it is intended to produce the transistor switch $T_1$ and the control transistor $T_2$ together with the resistor $R_1$ and expediently also together with the resistors $R_2$ and $R_3$ as integrated electronic block for instance of a silicon crystal plate, the advantage is obtained that this integrated building block can be produced with only four line terminals *a*, *b*, *d* and *e* and thus will correspond to the generally accepted standards.

When considering the fact that the control swell voltage between base and emitter section at the transistors $T_1$ and $T_2$ produced in the same diffusion method is of equal magnitude and with silicon transistors amounts to about 0.5 volts, and when further considering the fact that the control alternating voltage generated by *Sw* is in both semi-phases of equal magnitude and is inverse only as to polarity, the following advantages will be obtained when operating the circuit. While the control voltage induced in the control winding Sw and reduced by the voltage drop on the resistor $R_3$, will be in the position fully to control through the control resistor $T_2$ so that when mechanical shocks act upon the system and voltage peaks are generated in the control coil Sw, the condenser $C_1$ can be fully discharged, these voltage peaks can still be kept so small that they will by themselves be sufficient to control the transistor switch $T_1$. A race of the driving device can in this way be safely avoided. The control arrangement according to the invention will thus bring about a widening of the control range for the conditions of operation of the circuit above the rated output. The arrangement according to the invention additionally results in an improved control effect with regard to the changes of the voltage of operation and with regard to temperature variations. If, as voltage source, a dry battery is employed, the voltage of said battery will drop from the initial 1.7 volts with increasing discharge to 1.1 volts. As will be seen from the circuit, also the voltage of operation of the voltage divider $R_2$, $R_3$ will change to the same extent. The control of the transistor $T_2$ inherent thereto brings about an increase in the mean voltage at the base of the transistor $T_1$ and thus brings about a greater conduction of this transistor. It will thus be evident that at the working winding of the transistor switch it is possible to generate a voltage drop which is nearly independent of the voltage of the voltage source.

In order further to improve and increase the stabilizing effect of the arrangement according to the invention, the circuit illustrated in FIG. 2 has between the end of the resistor $R_2$ and the point *d* inserted a silicon diode D poled in conducting direction. This brings about that in view of the threshold voltage of approximately 0.5 volts prevailing with such a diode, the effective voltage of the battery with respect to the voltage divider is reduced from a range of 1.7 to 1.1 volts to a range of 1.2 – 0.6 volts. In contrast to a decrease of 35 percent, when diode D is absent, the decrease in the feeding voltage at the voltage divider $R_2$, $R_3$, when diode D is in the circuit, is about 50 percent whereby with a suitable dimensioning of the resistors $R_2$, $R_3$ a greater change will occur in the control voltage on the transistor $T_2$ than is the case with the embodiment of FIG. 1.

A further improvement in the operation of the circuit according to the invention will be possible by making the control swell voltage of the two transistors $T_1$ and $T_2$ of different magnitude. This may be done for instance when making these control elements in an integrated building block by selecting on the silicon plate for the base of the transistor $T_1$ a considerably smaller surface than for the base of the transistor $T_2$. This brings about that the control swell voltage on the transistor $T_1$ is relative to the control swell voltage on the transistor $T_2$ increased from 0.5 volts to 0.6 volts.

It is, of course, to be understood that the present invention is, by no means, limited to the particular showing in the drawing, but also comprises any modifications within the scope of the appended claims.

What is claimed is:

1. In a transistorized amplifier simultaneously providing both good stabilization and voltage amplitude relationship, especially for driving a timekeeping device; a first transistor, a battery having one pole connected to one of the emitter and collector respectively of said first transistor, a driving coil having one end connected to the other pole of said battery and the other end connected to the other of said emitter and collector of said first transistor, a control winding having one end connected to said other end of said driving coil, a charging capacitor having one side connected to the other end of said control winding and the other side connected to the base of said first transistor, a charge resistor having one end connected to said one pole of said battery and the other end connected to said other side of said charging capacitor, a second transistor having the collector-emitter path in parallel with said charging capacitor, and voltage superimposing means for supplying an opening pulse of control voltage to the base of said second transistor which is 180° out of phase with the opening pulse of control voltage concurrently supplied to the base of said first transistor, said voltage superimposing means comprising a voltage divider having one end connected to said one pole of said battery and the other end connected to the juncture of said driving and control coils and having a tap between said ends connected to the base of said second transistor.

2. A transistorized amplifier according to claim 1 which includes an additional element between said one end of said voltage divider and said one pole of said battery for reducing the voltage drop across said voltage divider.

3. A transistorized amplifier according to claim 2 in which said additional element is a diode.

4. A transistorized amplifier according to claim 1 in which said transistors are npn transistors and said one pole of said battery is the positive pole thereof and is connected to the collector of said first transistor, and the collector of said second transistor being connected to the side of said charging capacitor nearest the base of said first transistor.

5. A transistorized amplifier according to claim 1 which includes an on-off switch in service with said battery.

6. A transistorized amplifier according to claim 1 which includes an oscillation damping capacitor connected between the base of said first transistor and said one pole of said battery.

7. In a transistorized amplifier, especially for driving a timekeeping device; a first transistor, a battery having one pole connected to one of the emitter and collector of said transistor, a driving coil having one end connected to the other pole of said battery and the other end connected to the other of said emitter and collector of said first transistor, a control winding having one end connected to said other end of said driving coil, a charging capacitor having one side connected to the other end of said control winding and the other side connected to the base of said first transistor, a charge resistor having one end connected to said one pole of said battery and the other end connected to said other side of said charging capacitor, a second transistor having the collector-emitter path in parallel with said charging capacitor, and means for supplying an opening pulse of voltage to the base of said second transistor which is 180° out of phase with the opening pulse of voltage supplied to the base of said first transistor, said transistors being coordinated in an integrated electronic circuit block, the base area of said first transistor being substantially smaller than the base area of said second transistor.

* * * * *